US012682674B2

(12) United States Patent
Wang et al.

(10) Patent No.: US 12,682,674 B2
(45) Date of Patent: Jul. 14, 2026

(54) SYSTEMS AND METHODS FOR IMPROVED COMPUTER VISION IN ON-DEVICE APPLICATIONS

(71) Applicant: Google LLC, Mountain View, CA (US)

(72) Inventors: Qifei Wang, Sunnyvale, CA (US); Alexander Kuznetsov, Mountain View, CA (US); Alec Michael Go, Milpitas, CA (US); Grace Chu, Santa Clara, CA (US); Eunyoung Kim, Mountain View, CA (US); Feng Yang, Sunnyvale, CA (US); Andrew Gerald Howard, Culver City, CA (US); Jeffrey M. Gilbert, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 466 days.

(21) Appl. No.: 17/802,060

(22) PCT Filed: Feb. 24, 2020

(86) PCT No.: PCT/US2020/019456

§ 371 (c)(1),
(2) Date: Aug. 24, 2022

(87) PCT Pub. No.: WO2021/173110

PCT Pub. Date: Sep. 2, 2021

(65) Prior Publication Data

US 2023/0091374 A1 Mar. 23, 2023

(51) Int. Cl.
*G06V 30/413* (2022.01)
*G06V 10/22* (2022.01)

(52) U.S. Cl.
CPC ............ *G06V 30/413* (2022.01); *G06V 10/22* (2022.01)

(58) Field of Classification Search
CPC .................................................... G06V 30/413
See application file for complete search history.

(56) References Cited

U.S. PATENT DOCUMENTS

| | | | | |
|---|---|---|---|---|
| 9,443,314 | B1 * | 9/2016 | Huang | G06V 20/35 |
| 10,372,981 | B1 * | 8/2019 | Pashintsev | G06T 7/60 |

(Continued)

FOREIGN PATENT DOCUMENTS

| | | |
|---|---|---|
| CN | 109934214 | 6/2019 |
| CN | 110414527 | 11/2019 |
| JP | 6465427 | 2/2019 |

OTHER PUBLICATIONS

International Preliminary Report on Patentability for Application No. PCT/US2020/019546, mailed Aug. 25, 2021, 5 pages.

(Continued)

*Primary Examiner* — Ming Y Hon
*Assistant Examiner* — Dominique James
(74) *Attorney, Agent, or Firm* — DORITY & MANNING P.A.

(57) ABSTRACT

The present disclosure is directed to object and/or character recognition for use in applications such as computer vision. Advantages of the present disclosure include lightweight functionality that can be used on devices such as smart phones. Aspects of the present disclosure include a sequential architecture where a lightweight machine-learned model can receive an image, detect whether an object is present in one or more regions of the image, and generate an output based on the detection. This output can be applied as a filter to remove image data that can be neglected for more memory intensive machine-learned models applied downstream.

20 Claims, 11 Drawing Sheets

300

(56) References Cited

U.S. PATENT DOCUMENTS

| | | | | |
|---|---|---|---|---|
| 10,417,527 | B2 * | 9/2019 | Stolikj | G06V 40/172 |
| 10,540,572 | B1 * | 1/2020 | Kim | G06T 5/50 |
| 11,373,393 | B2 * | 6/2022 | Redmon | G06V 10/454 |
| 11,556,746 | B1 * | 1/2023 | Dasgupta | G06N 20/00 |
| 2012/0243731 | A1 | 9/2012 | Wang | |
| 2014/0254922 | A1 * | 9/2014 | Wang | G06V 10/462<br>382/159 |
| 2019/0259284 | A1 * | 8/2019 | Khadloya | G06V 10/25 |
| 2019/0355142 | A1 * | 11/2019 | Croxford | G06V 10/764 |
| 2019/0392242 | A1 * | 12/2019 | Tariq | G06V 20/58 |
| 2020/0160087 | A1 * | 5/2020 | Redmon | G06V 10/82 |
| 2020/0302163 | A1 * | 9/2020 | Shi | G06V 10/273 |
| 2021/0004589 | A1 * | 1/2021 | Turkelson | G06V 30/19173 |
| 2021/0232814 | A1 * | 7/2021 | Schultz | G06V 20/63 |

OTHER PUBLICATIONS

International Search Report and Written Opinion for Application No. PCT/US2020/019546, mailed Nov. 23, 2020, 10 pages.

International Preliminary Report on Patentability for Application No. PCT/US2020/019456, mailed Sep. 9, 2022, 7 pages.

Chinese Search Report Corresponding to Application No. 2020800989506 on Sep. 26, 2025.

* cited by examiner

200

300

302 — OBTAIN AN IMAGE DEPICTING AT LEAST ONE OBJECT IN A CLASS OF OBJECTS.

304 — PARTITION THE IMAGE INTO TWO OR MORE REGIONS THAT TOGETHER ENCOMPASS THE WHOLE OF THE IMAGE.

306 — PROVIDE EACH OF THE ONE OR MORE REGIONS TO A MACHINE-LEARNED MODEL CONFIGURED TO GENERATE AN OUTPUT BASED AT LEAST IN PART ON WHETHER ONE OF THE OBJECTS INCLUDED IN THE CLASS OF OBJECTS IS PRESENT IN THE REGION OF THE IMAGE.

308 — GENERATE, BASED AT LEAST IN PART ON THE OUTPUT, A DATASET REPRESENTATIVEOF ONLY THE REGIONS OF THE IMAGE WHERE AT LEAST ONE OBJECT INCLUDED IN THE CLASS OF OBJECTS IS PRESENT.

310 — DETERMINE, BASED AT LEAST IN PART ON THE OUTPUT, WHETHER TO PROVIDE ONE OF THE ONE OR MORE REGIONS TO A SECOND MACHINE-LEARNED MODEL

312 — GENERATE A LABEL FOR EACH OBJECT INCLUDED IN THE CLASS OF OBJECTS.

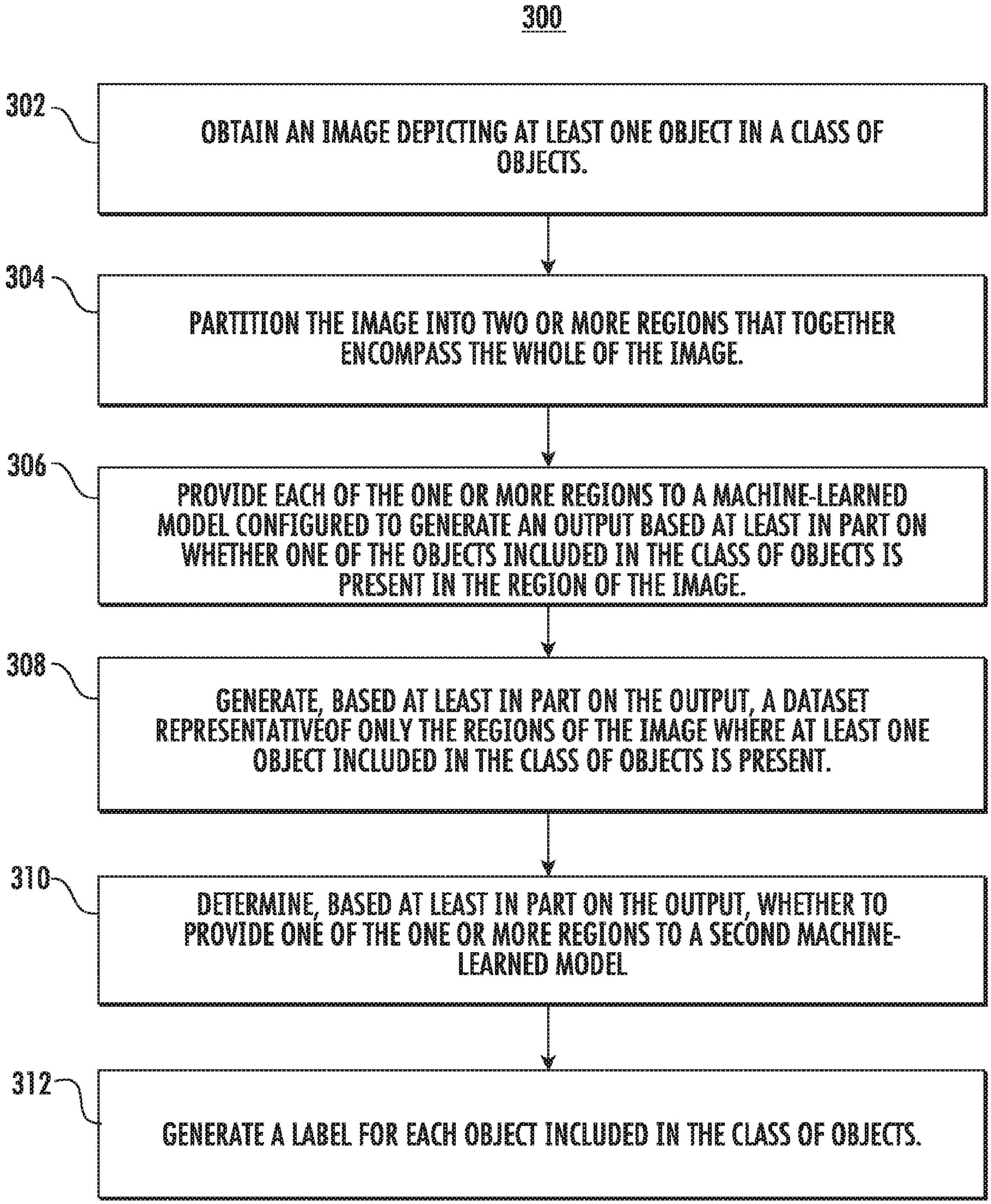

FIG. 3

SYSTEMS AND METHODS FOR IMPROVED COMPUTER VISION IN ON-DEVICE APPLICATIONS

PRIORITY CLAIM

This application is based upon and claims the right of priority under 35 U.S.C. § 371 to International Application No. PCT/US2020/019456 filed on Feb. 24, 2020, which is incorporated by reference herein.

FIELD

The present disclosure relates generally to computer vision. More particularly, the present disclosure relates to computer-implemented systems and methods which can provide more efficient models for performing object and/or character recognition using an initial coarse filter prior to more computationally expensive computing processes.

BACKGROUND

State-of-the-art object detectors including RCNN, SSD, FPN, etc., can be used to generate a bounding box around objects. These detectors can achieve high precision and recall though normally at high model complexity. For engines performing OCR, these must run through the entire image or a pyramid of images at different scales to perform detection. In general, multi-scale object detectors can improve object detection precision and recall at the cost of additional complexities. The combination of both of these complexities can make it difficult for applications involving object detection and/or image recognition on a local device (e.g., a mobile device such as a smartphone). Needed in the art are methods and systems that can extend computer vision models to on-device applications.

SUMMARY

Implementations according to the present disclosure can provide a first filter to process images via lightweight classification of one or more regions of the image. If a region is identified to include an object of interest (e.g., a word or character in a foreign language), the region can be sent to a second model that can be more specialized and memory intensive. For any region that is not identified to include an object, this region can be removed such as by masking the region or cropping the image so that underlying data is not sent to the second model. In this manner, implementations can improve the overall efficiency of computer vision tasks such as object or character recognition by segmenting images and running an initial model to filter image data being sent to a second downstream model.

BRIEF DESCRIPTION OF THE DRAWINGS

Detailed discussion of embodiments directed to one of ordinary skill in the art is set forth in the specification, which makes reference to the appended figures, in which:

FIG. 3 illustrates a flow chart diagram providing an example method for improving object detection and/or optical character recognition (OCR) in accordance with example implementations of the present disclosure.

Figure 1A:
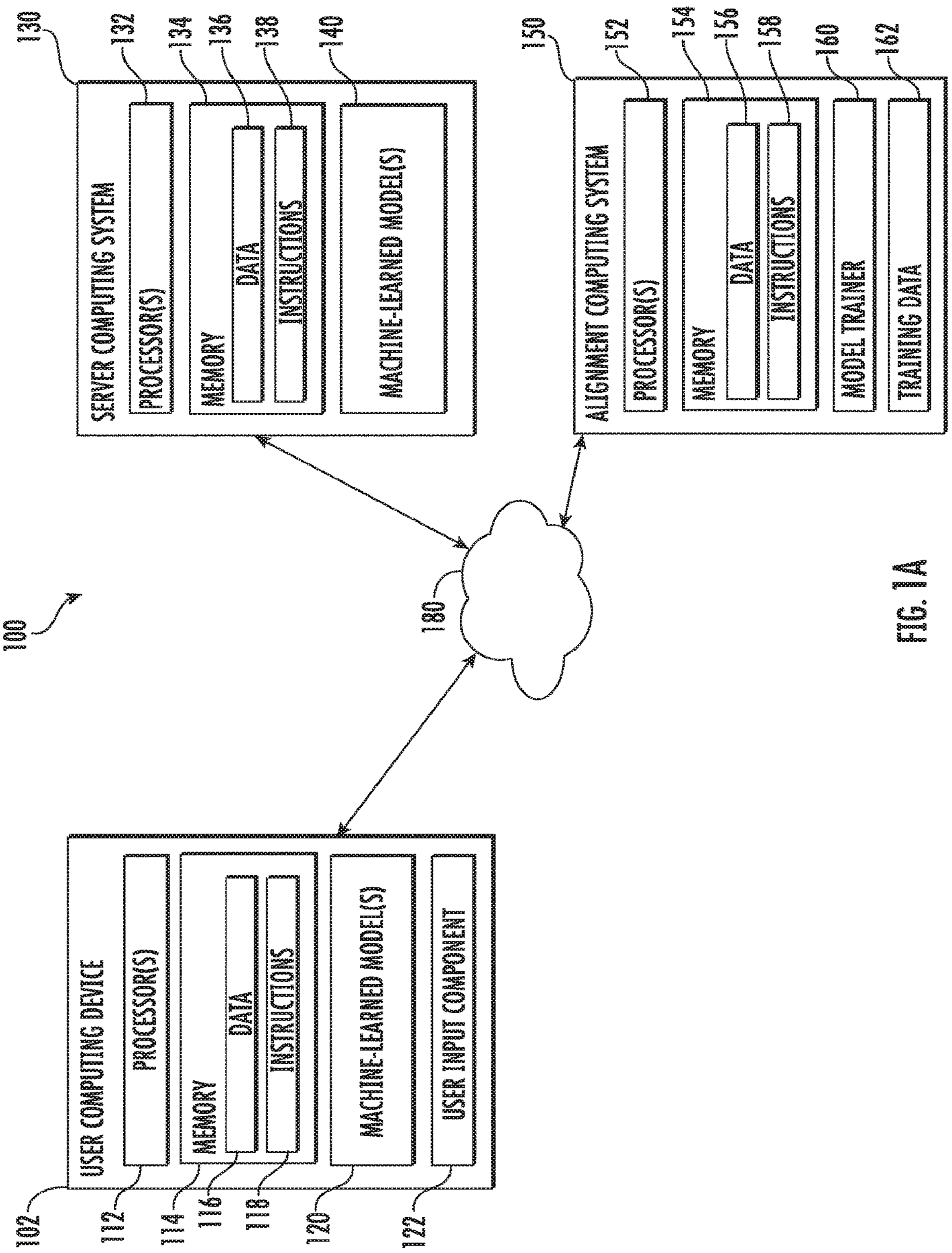
FIG. 1A illustrates an example computing system including one or more machine-learned model(s) in accordance with example implementations of the present disclosure.

Reference numerals that are repeated across plural figures are intended to identify the same features in various implementations.

DETAILED DESCRIPTION

Overview

Generally, the present disclosure is directed to systems and methods for performing object detection and/or optical character recognition (OCR) for use in applications such as computer vision, augmented reality, and autonomous vehicles. Advantages of the present disclosure include lightweight functionality that can improve implementation on devices such as smart phones. For instance, a smartphone performing real-time translation of text in a foreign language in images would need to determine the location of characters, identify characters present in the image, determine the language, and perform translation. Implementations according to the present disclosure can provide a first filter to process images via lightweight classification of one or more regions of the image. If a region is identified to include an object of interest (e.g., a word or character in a foreign language), the region can be sent to a second model that can be more specialized and compute and/or memory intensive. For any region that is not identified to include an object, this region can be skipped (e.g., by ignoring data not associated with a bounding box) and/or removed (e.g., by masking the region or cropping the image) so that underlying data is not sent to the second model. In this manner, implementations can improve the overall efficiency of computer vision tasks such as object detection and/or optical character recognition by partitioning images and running an initial model to filter image data being sent to a second downstream model.

The first model may be "multi-headed" in that the output of the model may include multiple "heads", each associated with a respective region of the image. Aspects of some heads of the multiple heads can include whether or not (or the likelihood that) the associated region (e.g., the region on which the head was trained) includes an object of interest. In this way, the first model may process the whole image in a single pass, as opposed to each of the regions being provided to the model sequentially. Further, in some implementations, the first model can include additional heads which indicate other characteristics or properties of the image. Several non-limiting examples include: whether an object of a particular class (e.g. a barcode) is present in the image, the orientation an object of interest (e.g. text) in the image, other similar properties, or any combinations thereof. The first model may thus be a multi-headed model trained on image data including labeled bounding boxes that identify both presence of an object, the object orientation, and the object density or heat (e.g., on a per-pixel basis). In particular, during training the lightweight model can learn from each head to generate outputs that would improve operation of task(s) performed by a second downstream model.

As an example for the purpose of illustration, an image of an awards ceremony may include a banner or poster that is displayed in only the lower half of an image. This banner can include text such as English characters or numbers. Using implementations according to the present disclosure, the image may be partitioned so that image is divided into 4 quadrants or regions. A machine-learned model can take each quadrant and classify it based on the presence of an object such as text. Since text is only present in the lower half of the image, the upper quadrants can be removed or ignored (e.g., by masking) and only data associated with the lower half of the image provided to a second machine-learned model.

One example aspect of the present disclosure includes dividing the image into two or more regions using at least one partition. In general, a partition can be defined by a horizontal line or a vertical line going from one edge of an image to the opposite edge (e.g., right edge to left edge for a horizontal line and top edge to bottom edge for a vertical line). For instance, a vertical line can be used to divide the image into a right region including the area from the vertical line to the right edge and a left region including the area from the vertical line to the left edge. Similarly, a horizontal line can be used to divide the image into a top region including the area from the horizontal line to the top edge and a bottom region including the area from the horizontal line to the bottom edge. For implementations where more than one partition is applied, the partitions can be combined. As an example, a horizontal line and a vertical line can be used to divide an image into a top-right region, a bottom-right region, a top-left region, a bottom-left region. It should be understood that additional combinations of horizontal and vertical lines may be used to further define regions without limitation to only those regions recited herein.

Additionally, while partitions are generally discussed as spanning from one edge of an image to another edge of an image, it should be understood that partitions can be defined in a variety of ways. For example, in certain implementations partitions can be defined as spanning from one pixel in the image (e.g., a first pixel location) to a second pixel in the image (e.g., a second pixel location). These pixel locations can be defined based on a coordinate system. For example, a two-dimensional image can use a two-dimensional coordinate system where each pixel can be defined by a first coordinate position (e.g., an x-coordinate) and a second coordinate position (e.g., a y-coordinate). In this manner, partitions can be defined to segment an image into various regions such as 4 corner regions (top right, top left, bottom right, bottom left) and 1 center region. Further, certain regions (e.g., the center region) may be defined by partitions that do not include a coordinate position at the edge of the image. By defining partitions in this manner, implementations may demonstrate improved efficiency in recognition of objects that are normally centered such as faces. Further, in some implementations, the partitions can be defined such that the two or more regions include an area of overlap.

For implementations according to the present disclosure, the partitions can be defined in various ways. Lightweight models may demonstrate advantages using static partitions such as partitions that are pre-defined prior to performing the detection task. For instance, the one or more partitions can be defined based on a constant, c, that can be applied to any image regardless of image size. The constant can specify a relative value such as 50% image height and/or 50% width to divide the image into relatively equal regions. Alternatively, the constant may specify a pixel height and/or a pixel width. In such cases, the received image may undergo initial processing to adjust the image size to a processing size suitable for the pixel height and/or the pixel width.

Further, to determine the constant c, a machine-learned model can be applied to optimize a function for dividing the image based on the general location of the object in a set of training images. As one example, in some implementations, the constant may be determined at least in part by maximizing a response signal that pixels in a region are associated with the object using a set number of regions. As another example, in certain implementations, the constant can be determined in part by a constraint such as maximizing the response signal that pixels in a region are associated with the object using a variable number of regions (e.g., a variable number of partitions). When using a variable number of regions, additional constraints may be applied to limit the number of regions. For instance, optimization can be configured to minimize the number of regions while also maximizing the response signal based on applying a weight to each constraint. These weights can be derived for example from a machine-learned model such as a neural network and response signals may be estimated by determining a heat map of object signals in images.

In this manner, certain implementations can utilize information derived from a machine-learned model to improve determining the partitions. Further these image partitions can be associated with a specific object of interest (e.g., faces, text, or machine-readable code such as QR codes or barcodes). Using learned partitions can provide advantages for certain tasks. For instance, since the partitions may be associated with a specific object of interest, patterns in imagery can be extracted such as birds and trees being present in the sky, or other objects that are generally in the upper portion of an image.

After partitioning the image into two or more regions. Each of the regions can be provided to a first machine-learned model (e.g., a classifier) to determine whether each region includes imagery depicting an object of interest (e.g., text, numbers, machine-readable code, or faces). The first machine-learned model can be multi-headed, and generally is configured to determine whether each region includes or doesn't include imagery of the object. For instance, the first machine-learned model can be configured to generate a confidence (e.g., a percentage) that the region includes imagery of the object. This confidence can be provided as direct output or in certain implementations the confidence may be used to generate a binary response whether the object is present in the region (e.g., 1 or true) or is not present in the region (e.g., 0 or false).

Based on the output of the first machine-learned model, the image and/or data associated with the image can be modified to reduce computational resources for further machine-learning tasks. For example, if the first machine-learned model determined that the object is present in two out of four regions of the image, the boundaries defining these regions (e.g., the partitions) can be used to crop or mask the original image. Thus, modifying the image can include defining the region of the image based on one or more of an image border (e.g., right, left, top, bottom), a first partition, a second partition, a third partition, and/or a fourth partition. To avoid overlap or partitions that intersect a portion of the object, a threshold can be included in some implementations to increase the region beyond the partition. For vertical partitions this threshold can include a horizontal displacement towards an adjoining region that is determined to not include the object. For horizontal partitions this threshold can include a vertical displacement towards an adjoining region that is determined to not include the object. For cases where the adjoining region is determined to include the object the image is generally modified to include the adjoining region and so the threshold need not be applied for these instances of modifying the image. As should be understood, aspects of modifying the image may be separately defined from dividing the image into regions. As an example for illustration, while certain implementations may partition the image using static partitions, these implementations are not limited to modifying the image using the same static partitions. Rather these implementations can still include thresholds that may be used to extend the region of the image when modifying the image.

In some instances, the modified or masked image (e.g., data representative of the regions of the images based on applied modifications) can be provided to a second machine-learned model. Aspects of the second machine-learned model can include further computer vision tasks such as determining a label for the object (e.g., each instance of the object) in the modified image. As an example, the second machine-learned model can be configured to generate a label for each instance of an object included in a set of objects with a bounding box indicating the area or centroid of the object. As one example, the object can include a letter, and the set of objects can include the English alphabet. The second machine-learned model can process the modified image to identify each instance of letters included in the English alphabet and assign each a bounding box. In some implementations, the second machine-learned model may include other heads such as a multi-label classifier configured to associate a letter with the bounding box. For certain implementations, machine-learned models for natural language processing can be included downstream of the second machine-learned model to extract further semantic knowledge from labels assigned by the second machine-learned model (e.g., letters and spacing between bounding boxes can be used to extract words). Since these downstream tasks can be more memory intensive, using a modified image or only providing some of the regions to the second machine-learned model can greatly decrease processing.

Advantages of implementations according to the present disclosure include improved efficiency that can reduce energy, memory, and/or latency costs. These savings can allow certain implementations to be included on mobile devices for on-device computer vision systems.

Implementations in accordance with the present disclosure include methods that can be executed on a variety of computing systems. In general, these methods may include obtaining an image (e.g., using a camera) depicting at least one object in a class of objects. The method can further include partitioning the image into two or more regions that together encompass the whole of the image. Each of the two or more regions can be provided to a machine-learned model configured to generate an output (e.g., true or false) based in part on whether one of the objects included in the class of objects is present in the regions of the image. Based at least in part on the output, the method may determine to provide a modified image (e.g., an image including one of the one or more regions) to a second machine-learned model. The second machine-learned model can be associated with a classification or labeling task and generally its performance scales with the size of the image.

For some implementations, the method can further include generating a dataset representative of only the regions of the image where at least one object included in the class of objects was determined to be present based on the output. For instance, example output can include a binary prediction that a region includes imagery of an object (r-true) or a region does not include imagery of an object (r-false). For regions predicted to include imagery of an object, example datasets can include a masked image (all r-false regions are set to zero or another background value), a cropped image (image boundaries are modified to exclude all r-false regions), one or more images for each r-true region or similar datasets representative of the regions identified by the machine-learned model as including the object. To limit data loss or false negatives, the dataset may include modified regions by applying a threshold to extend r-true regions that are adjacent to r-false regions not predicted to include imagery of the object. This can also be used to account for instances where a partition intersects an object.

In certain implementations, the method can be restricted so that at least one of the one or more regions is not provided to the second machine-learned model. For instance, implementations according to the present disclosure may provide additional benefits for imagery including only sparse instances of the object. Identifying sparse objects is a challenge since it involves neglecting a large portion of incoming data. Thus, some implementations may be limited to images that include only sparse objects such as text, number(s), and/or machine-readable code.

With reference now to the Figures, example embodiments of the present disclosure will be discussed in further detail (e.g., barcodes).

Example Devices and Systems

FIG. 1A depicts a block diagram of an example computing system 100 that can store or transmit information such as machine-learned models 122 or 140 according to example aspects of the present disclosure. In one example implementation, the system 100 can include a user computing device 102 and a server computing system 130 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 can include one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include the machine-learned model(s).

In certain implementations, the machine learned model(s) 120 can be received from the server computing system 130 over network 180, stored in the user computing device memory 114, and then used or otherwise implemented by the one or more processors 112. In some implementations, the user computing device 102 can implement multiple parallel instances of a single machine-learned model (e.g., to perform parallel object detection for real-time image processing such as in video streams).

Additionally or alternatively, the machine-learned model (s) 120 can be included in or otherwise stored and implemented by the server computing system 130 that communicates with the user computing device 102 according to a client-server relationship. For example, the machine-learned model(s) 120 can be implemented by the server computing system 130 as a portion of a web service. Thus, the machine-learned model(s) 120 can be stored and implemented at the user computing device 102 and/or machine learned model(s) 140 can be stored and implemented at the server computing system 130. Since, in some implementations, the machine learned model can include a first model for filtering image data and a second model for performing additional image processing such as optical character recognition, each of these models can be individually accessed and/or transmitted between the user computing device 102 and the server computing system 130. Additionally, other operations performed by example implementations such as modifying image data or generating a modified image may be included as part of memory 114 on the user computing device 102, on memory 134 included on the server computing system 130, or any combination thereof. Alternatively, for certain implementations, the other operations may only be included as part of memory 114 on the user computing device 102. For instance, including all of the operations and machine-learned model(s) on a single device may improve efficiency by reducing the need for data transmission between the user computing device 102 and the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a camera, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include machine learned model(s) 140. Example machine-learned models include neural networks or other multi-layer non-linear models. Example neural networks include feed forward neural networks, deep neural networks, recurrent neural networks, and convolutional neural networks.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well.

Figure 1B:
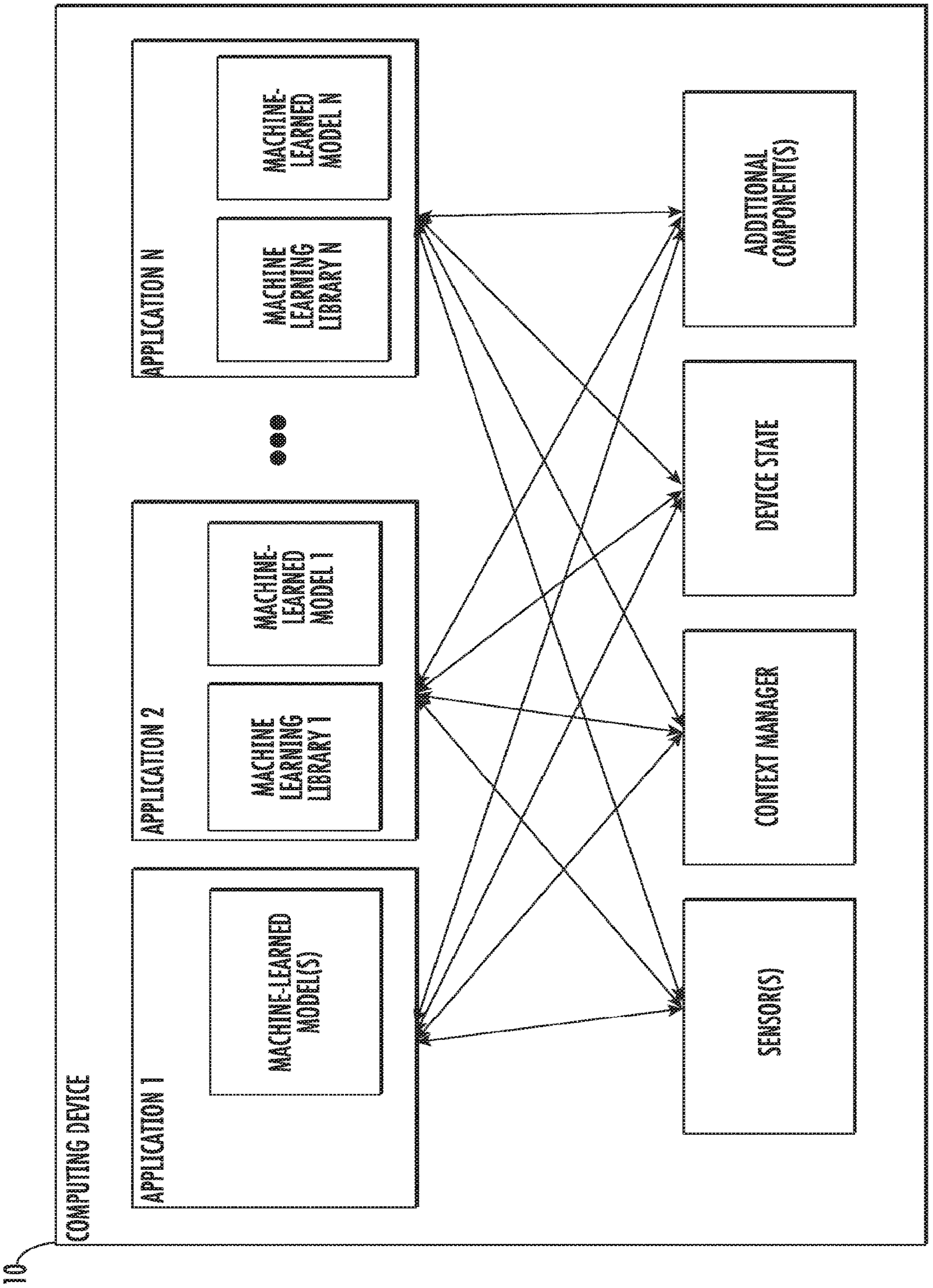
FIG. 1B illustrates an example computing device including one or more machine-learned models(s) in accordance with example implementations of the present disclosure.

FIG. 1B illustrates an example computing device 10 including one or more machine-learned models in accordance with the present disclosure. Each of these machine-learned model(s) can be associated with an application such as image classification, labeling, object recognition, or other similar functions described herein. Each machine-learned model can be trained using a machine learning library that can include labeled data for performing supervised training tasks. As one example, one machine-learned model may be configured to determine weights for partitioning images displaying a certain set of objects. This machine-learned model can include images that have been labeled with object location(s) and object id(s).

Each of the machine-learned models can be separated trained using different machine learning libraries as illustrated. For example, this segmented training can be used to produce a sequential architecture where output from one machine-learned model (e.g., model 1) can be transmitted to a second machine-learned model (e.g., model 2). Alternatively or additionally, at least two of the machine-learned models can be trained using the same machine learning library or a combination of machine learning libraries. By combining training data, a single machine-learned model can be configured to output multiple heads.

Further these machine-learned model(s) can be in communication with other components of the computing device such as sensor(s) (e.g., a camera), a context manager, a device state, or other additional components.

Figure 1C:
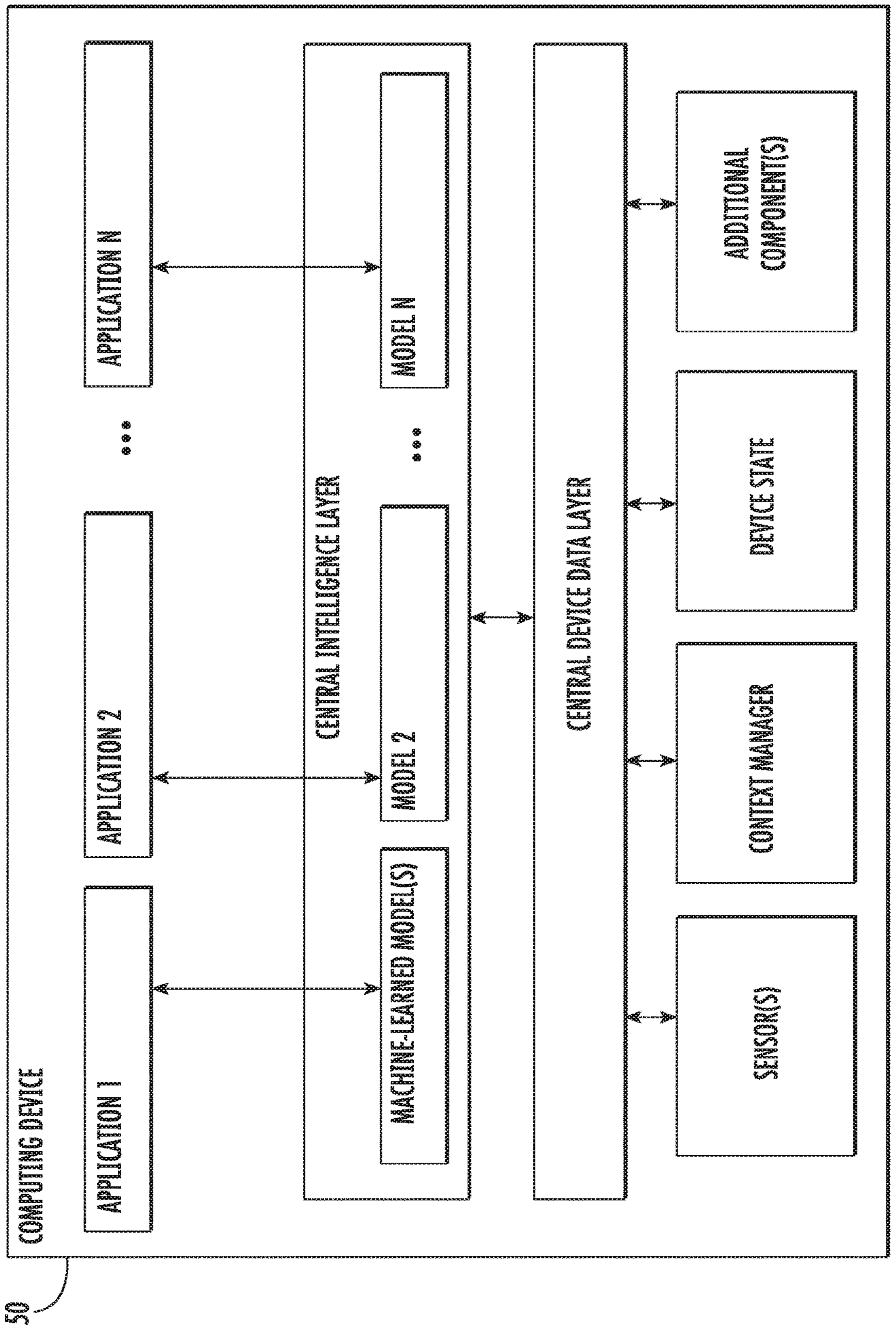
FIG. 1C illustrates another example computing device including one or more machine-learned model(s) in accordance with example implementations of the present disclosure.

FIG. 1C illustrates another example computing device 50. The example computing device 50 can include one or more machine-learned models for improving object detection efficiency and/or tasks related to object detection such as optical character recognition, or other computer vision tasks according to example implementations of the present disclosure.

Example Partition Attributes

Figure 2A:
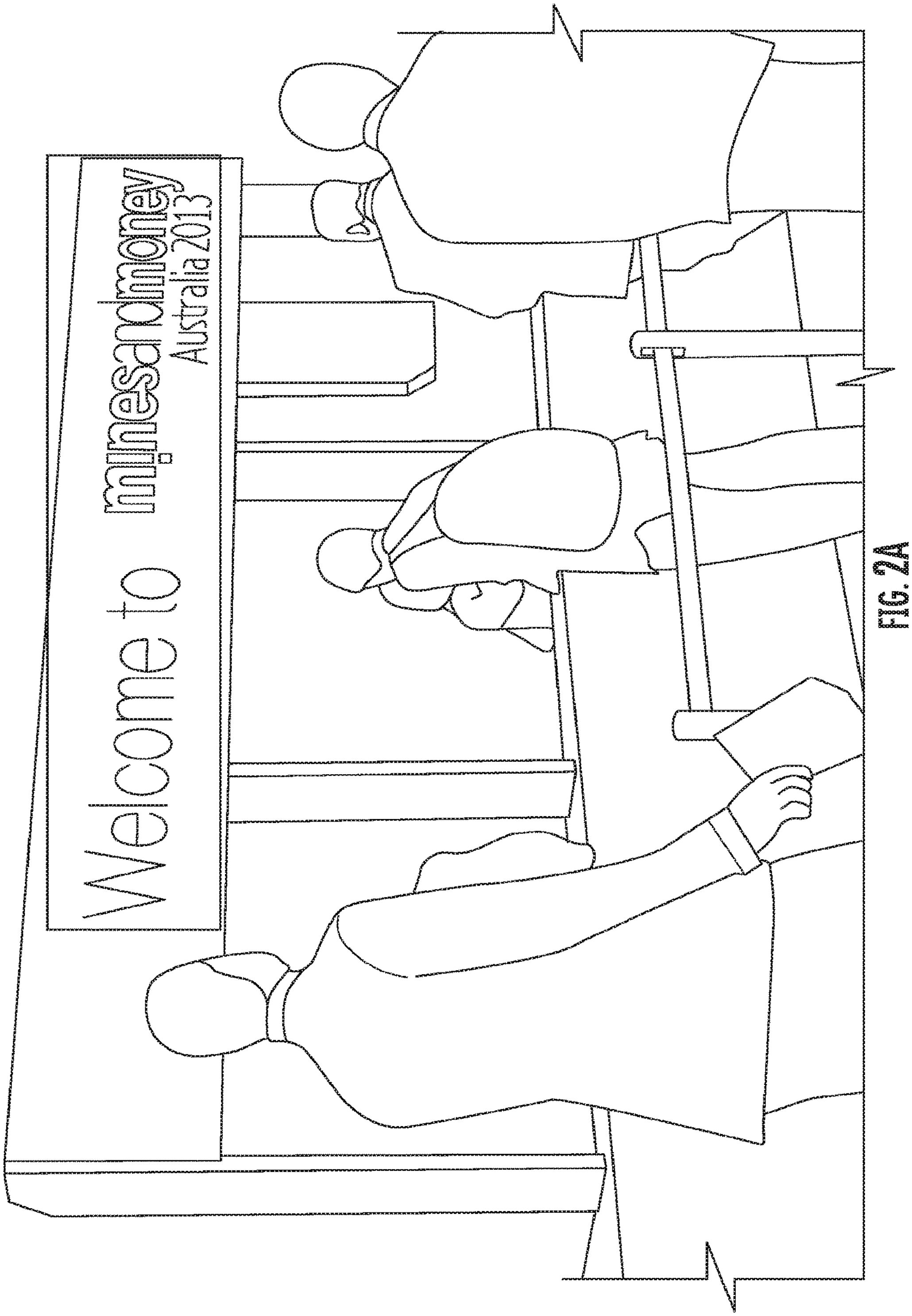
FIGS. 2A-2E depict images illustrating an example process for filtering image data in accordance with example implementations of the present disclosure.
Figure 2B:
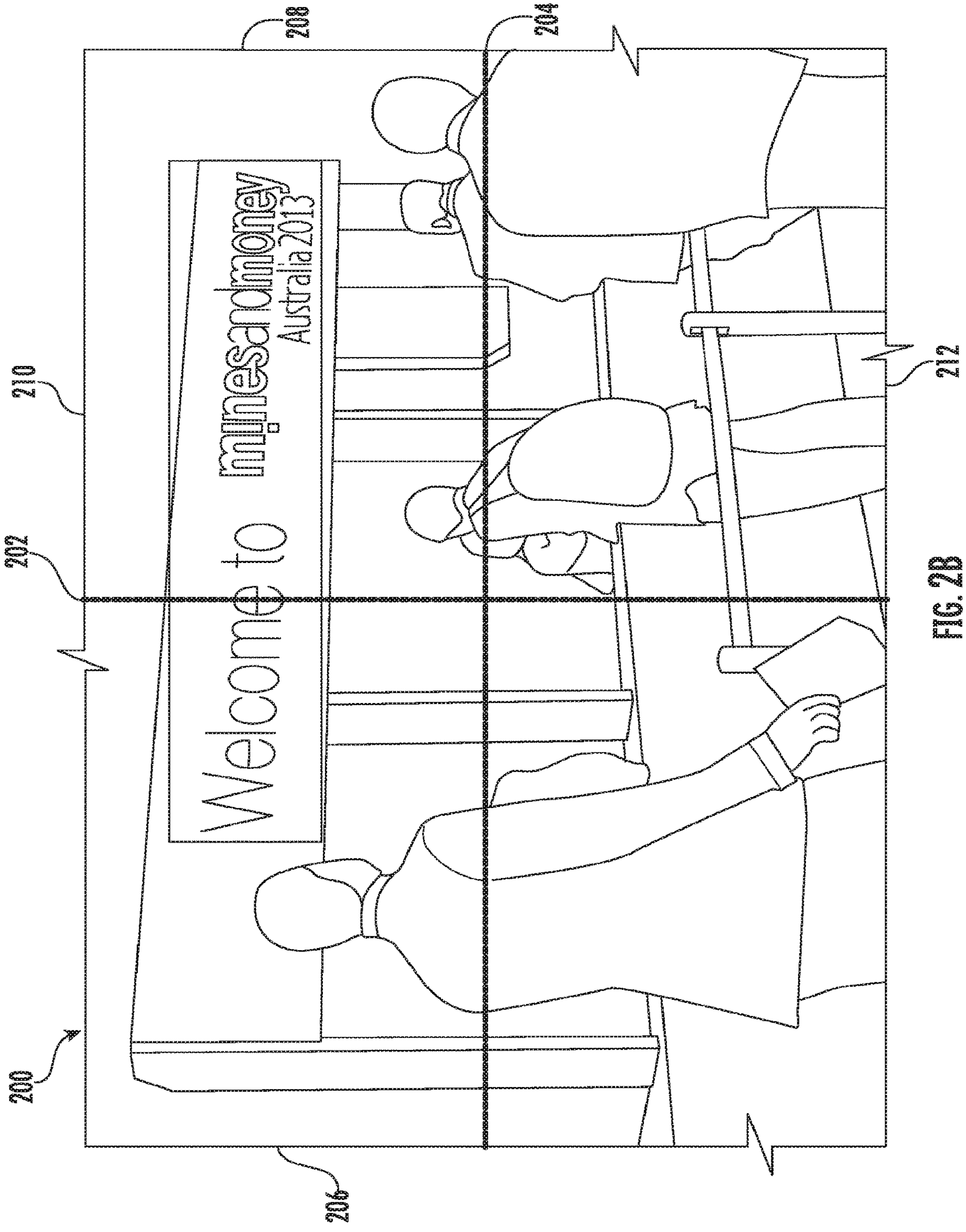
Figure 2C:
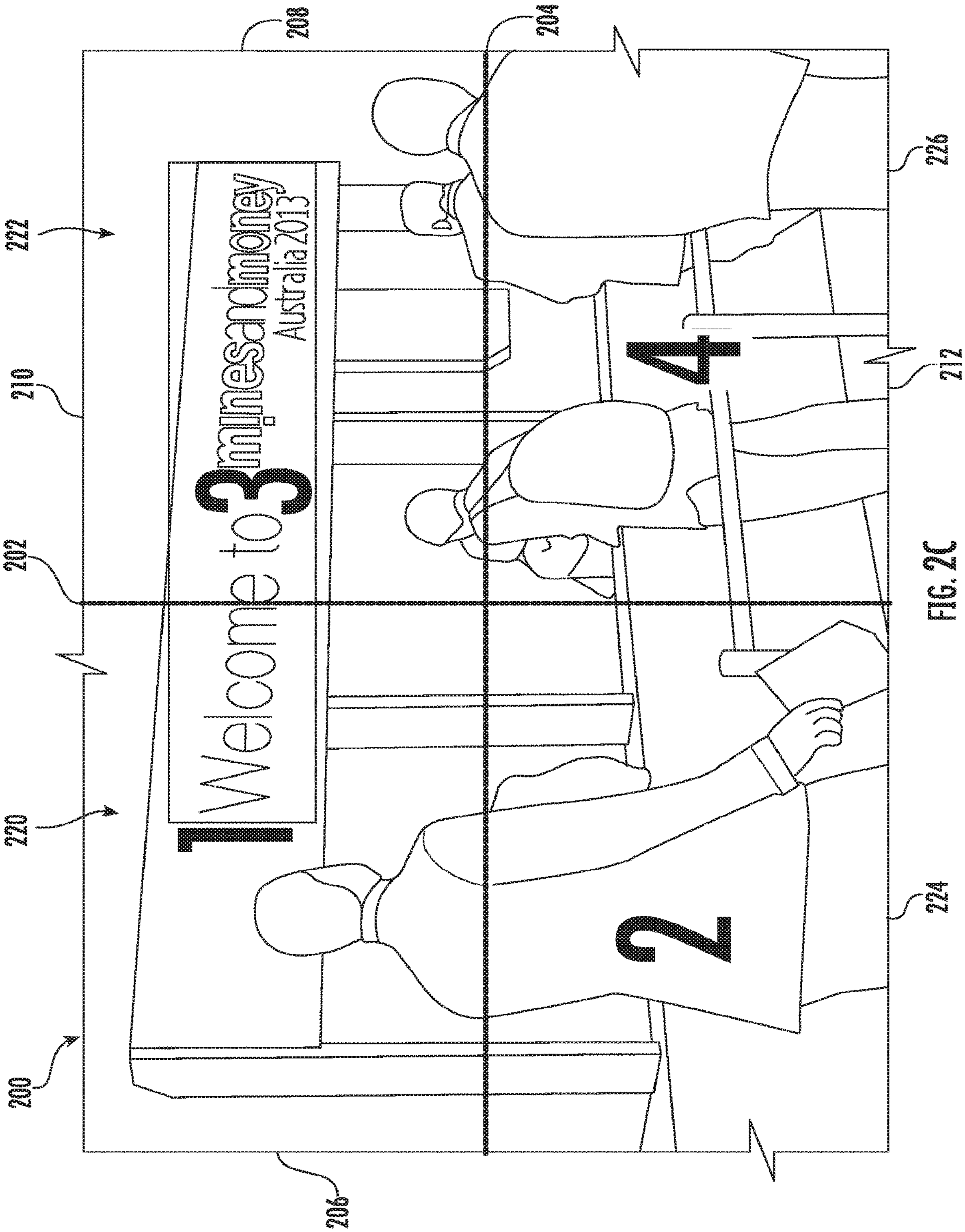

FIGS. 2A-2C depict illustrations of aspects of partitioning the image into two or more regions that together encompass the whole of the image. For instance, FIG. 2A depicts an example image 200 that systems and methods according to the present disclosure may obtain for performing object detection. As shown in FIG. 2B, the image 200 can be divided into one or more regions using one or more vertical partition 202 and/or one or more horizontal partition 204 that can span from one edge of the image to another edge. The image 200 is generally rectangular, defining a left edge 206, a right edge 208, a top edge 210, and a bottom edge 212. While the vertical partition 202 is displayed spanning from the top edge 210 to the bottom edge 212, it should be understood that partitions can be defined such that a partition may span from one edge to one partition. For example, vertical partition 202 can be defined as spanning from the top edge 210 to horizontal partition 204. In this manner, dividing the image 200 can be used to define any number of regions greater than one. FIG. 2C illustrates the image in FIG. 2B with 4 specified regions. Using one vertical partition 202 and one horizontal partition 204, 4 regions can be defined such as an upper left region 220 defined by the left edge 206, the top edge 210, the vertical partition 202, and the horizontal partition 204. An upper right region 222 can be similarly defined, as shown in the image, by the right edge 208, the top edge 210, the vertical partition 202, and the horizontal partition 204. Area bounded by the bottom edge 212, the vertical partition 202, the horizontal partition 204, and the left edge 206 or the right edge 204 can be used to define the bottom left region 224 or the bottom right region 212, respectively.

Example Model Output and Modified Image

Figure 2D:
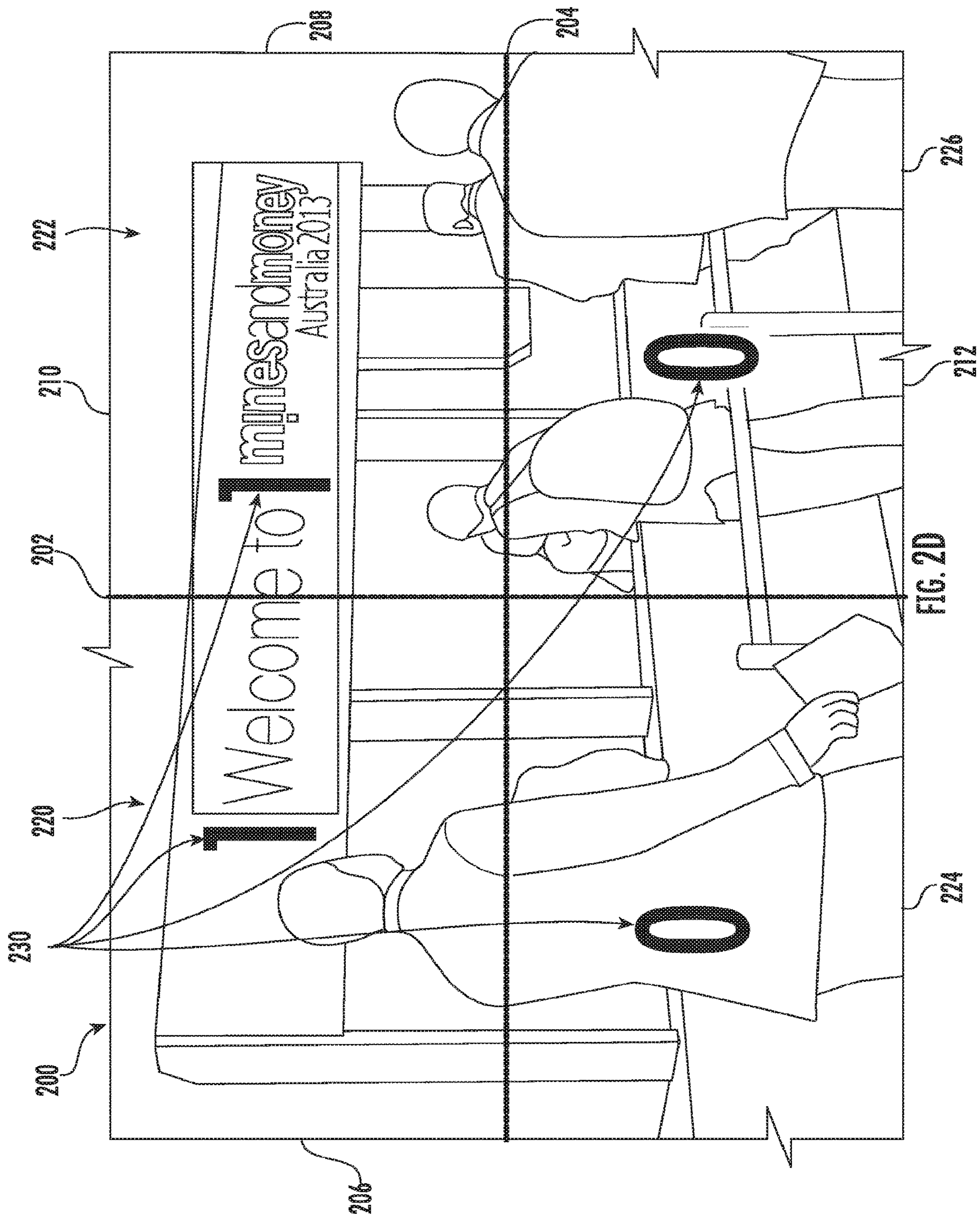

FIG. 2D depicts example model output of a first pass machine-learned model for improving object detection and/or recognition. The machine-learned model can receive, as input, an image 200 partitioned into two or more regions. Each region can be separately provided to the machine-learned model, for instance, by masking the other regions. As an example for illustration, the upper left region 220 can be provided to the machine learned model by masking or otherwise removing image data for the upper right region 222, lower left region 224, and lower right region 226. Alternatively, in some implementations the machine-learned model may be trained using partitioned training examples including labels based on the partition scheme used (e.g., vertical partition 202 and horizontal partition 204). Thus, the machine-learned model may receive each of the one or more regions as a whole, rather than providing each separately. Based on the presence of an object depicted in the region, the machine-learned model can generate an output 230 for each region. In some implementations, the machine-learned model can be trained as a binary classifier using training examples of images that include text (e.g., letters, numbers, words) or include no text. Thus, example output can be either True (e.g., 1) or False (e.g., 0) for each region of the image. Since the example image 200 includes a banner displaying text in the upper left region 220 and upper right region 222, these regions can be assigned a "1" and the lower left region 224 and lower right region 226 can be assigned a "0".

Figure 2E:
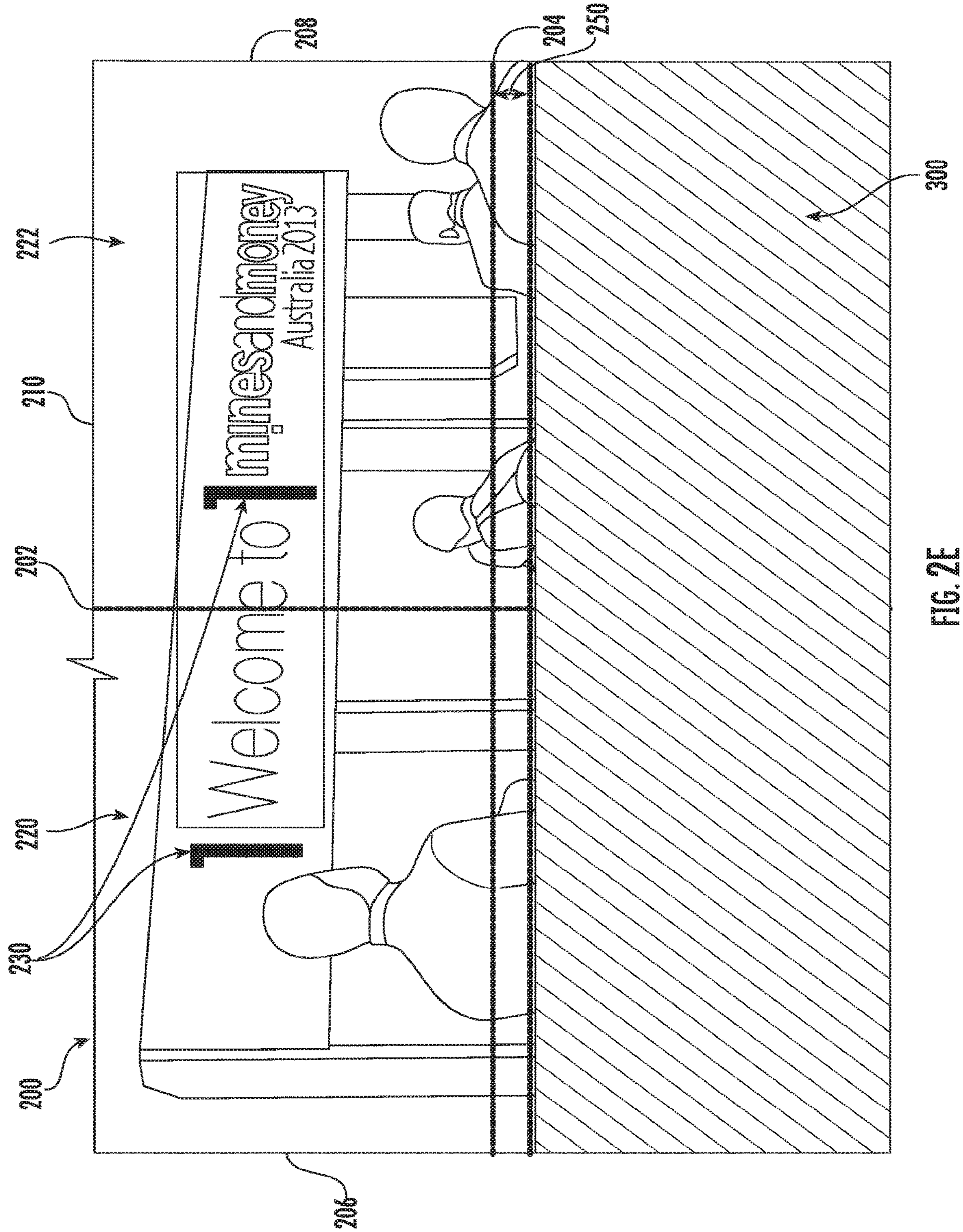

FIG. 2E depicts example processing that certain implementations may include for modifying the image 200 based at least in part on the outputs 230 for each region. For regions predicted by the model to include imagery of the object, these regions may remain unchanged. For regions predicted by the model to not include imagery of the object, these regions may be removed 300 such as by cropping the section or masking the image data by modifying the color values to a background or other ignored signal. Certain implementations may also include a method for partially removing these regions such as including a threshold 250 which can define a distance, d, for extending the region to include some of the image data in an adjacent region that was predicted to not include the object. In general, this data would be removed or otherwise ignored by the second machine learned model. By including a threshold, these implementations can help reduce false negatives that may occur, for example, when a partition intersects the object.

Figure 2F:
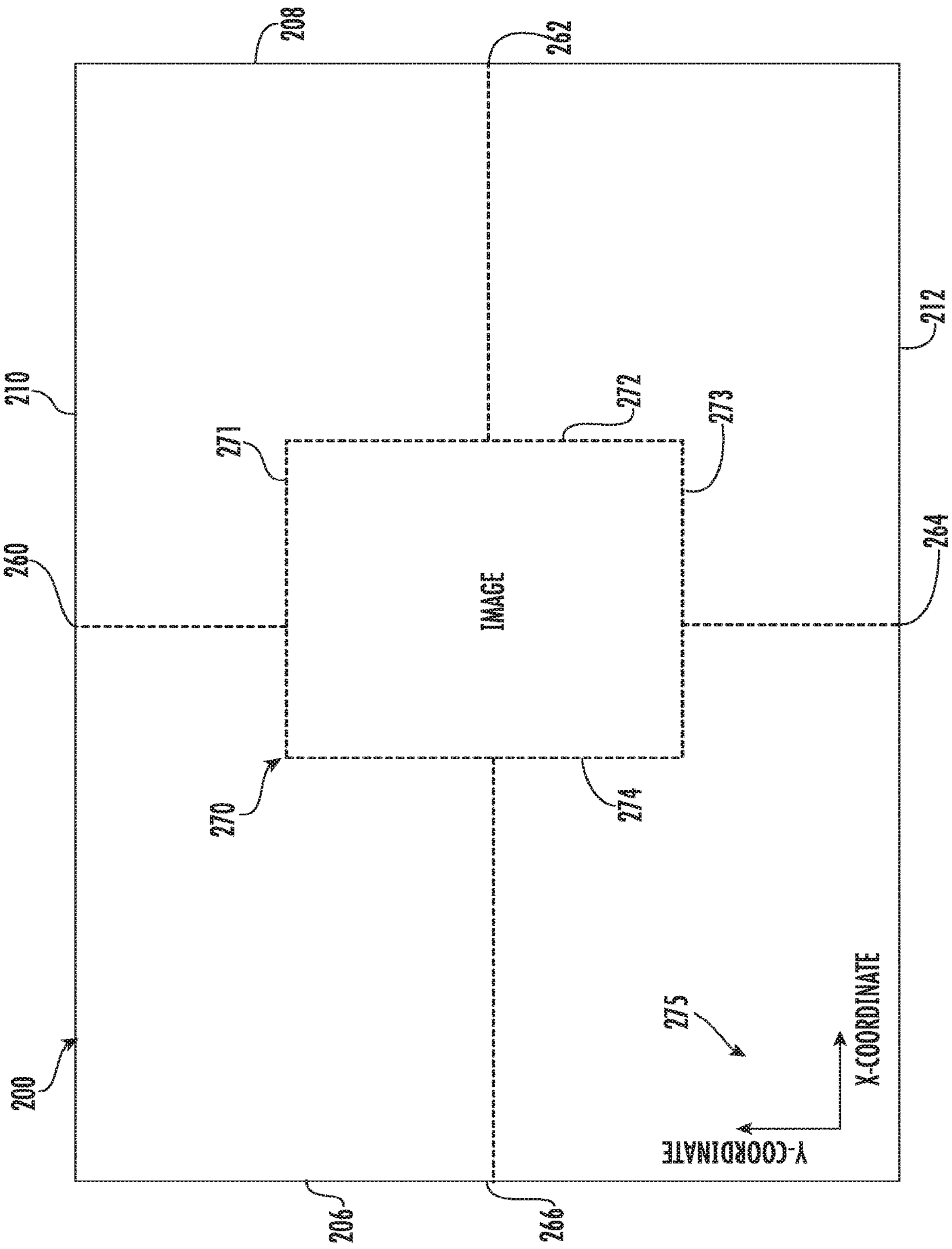
FIG. 2F depicts an example for partitioning an image into two or more regions in accordance with example implementations of the present disclosure.

FIG. 2F depicts an example of partitions that can be defined based on pixel location rather than spanning from one edge of an image to a second edge. As illustrated, image 200 can be any image such as a photograph, an image frame extracted from a video, or similar data embodying visual imagery. The image 200 can be defined as a matrix of pixels where each pixel can be associated with a pixel location and a pixel color. The pixel location can be defined using coordinates based on the type of image. For instance, two-dimensional images can be defined by two coordinates (e.g., an x-coordinate and a y-coordinate) 275. In this manner, various partitions can be defined such as a first partition 260 spanning from the top edge 210 to a coordinate position along first internal partition 274, a second partition 262 spanning from the right edge 208 to a coordinate position along second internal partition 272, a third partition spanning from bottom edge 212 to third internal partition 273, and a fourth partition spanning from top edge 210 to fourth internal partition 271. Further, as illustrated the first internal partition 274, second internal partition 272, third internal partition 273, and forth internal partition 271 can be defined to span coordinate locations that are not associated with an edge of the image 200. In this manner, a center region 270 of the image 200 can be created as one of the at least two pre-defined regions.

Example Methods

FIG. 3 depicts a flow chart diagram of an example method to perform object detection and/or recognition according to example implementations of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can obtain an image depicting at least one object in a class of objects. Obtaining the image can include accessing a database of stored data, generating an image using a device such as a camera that can be included in the computing system or can be in communication with the computing system. Further, while recited as obtaining an image that depicts at least one object, it should be understood that implementations according to the present disclosure can be used to filter images that include no objects in the set of objects. These implementations can improve the efficiency of higher complexity machine-learning tasks such as OCR, by filtering images that do not include any text or alphanumeric characters.

At 304, the computing system can partition the image into two or more regions that together encompass the whole of the image. Partitioning the image can include accessing one or more static partitions such as vertical or horizontal partitions for dividing the image into a first region that can be defined by the one or more edges of the image frame and/or one or more partitions and a second region defined by one or more edges of the image frame and/or one or more partitions. In some cases, additional regions (third, fourth, fifth, sixth, seventh, eighth, ninth, etc.) can be produced that may also be defined by one or more edges of the image frame and/or one or more partitions.

At 306, the computing system can provide each of the one or more regions to a machine-learned model configured to generate an output based at least in part on whether one of the objects included in the class of objects is present in the region of the image. Aspects of the machine-learned model can include a model architecture such as one or more heads (e.g., outputs). In some implementations, the model can include a classifier configured to determine a confidence that data representative of an image (e.g., a region of an image) is representative of an object included in the class of objects (e.g., the region of the image includes imagery representing a letter in the English alphabet). Based on the imagery, the classifier can output a confidence (e.g., a percentage) that in certain implementations can be converted to a binary response (e.g., True or False). The machine-learned model may be multi-headed such that the whole partitioned image is processed in a single pass. Put another way, the whole image may be provided as input to the machine-learned model, with the output being an array of results with each result indicating whether or not (or a confidence that) a corresponding region includes an object of interest. Thus, the machine-learned model may not necessarily partition the image into separate regions, but rather each head may be trained to localize to a region of the image based on pre-defined partitions defined during training. In this manner, partitioning does not necessarily include creating one or more datasets defining each region.

Another aspect of the machine-learned model can include a head trained to perform another task associated with image data. As one example, the machine-learned model can also be trained to determine an orientation for objects included in the image. The orientation can span a range of values such as 0°-360°, 0-2π, or other similar values defining a rotation or angle relative to a basis position.

A further aspect of the machine-learned model can include generating a null output. The null output can indicate that the image included no objects in the set of objects.

At 308, the computing system can generate, based at least in part on the output, a dataset representative of only the regions of the image where at least one object included in the class of objects is present. For instance, the computing system can include instructions for modifying the image (e.g., accessing an image editor using an API) by masking or cropping regions of the image that were identified to not include imagery of the object.

At 310, the computing system can determine, based at least in part on the output, whether to provide one of the one or more regions to a second machine-learned model. For example, the computing system may determine to provide the dataset representative of only the regions of the image where at least one object included in the class of object is present. Alternatively, the computing system may determine to provide only one of the one or more regions to the second machine-learned model. Thus, it should be understood that not every instance of method 300 need include performance of each and every step such as including performance of step 308. As will be appreciated, if no objects of interest have been identified in any of the regions, none of the regions may be provided to the second machine-learned model.

At 312, the computing system can generate a label for each object included in the class of objects. For instance, the second machine-learned model can be trained to determine a label based on receiving image data depicting an object in a certain class of objects. Example labels can include positional information that can be used to construct a bounding box. Additionally or alternatively, labels can include identifying markers that can be determined by a multi-label classifier (e.g., to assign a character a letter in the English language).

From at least the combination of operations described in FIG. 3, computing systems according to the present disclosure can perform object detection and/or optical character recognition with improved efficiency.

Example Model Architecture

Figure 4:
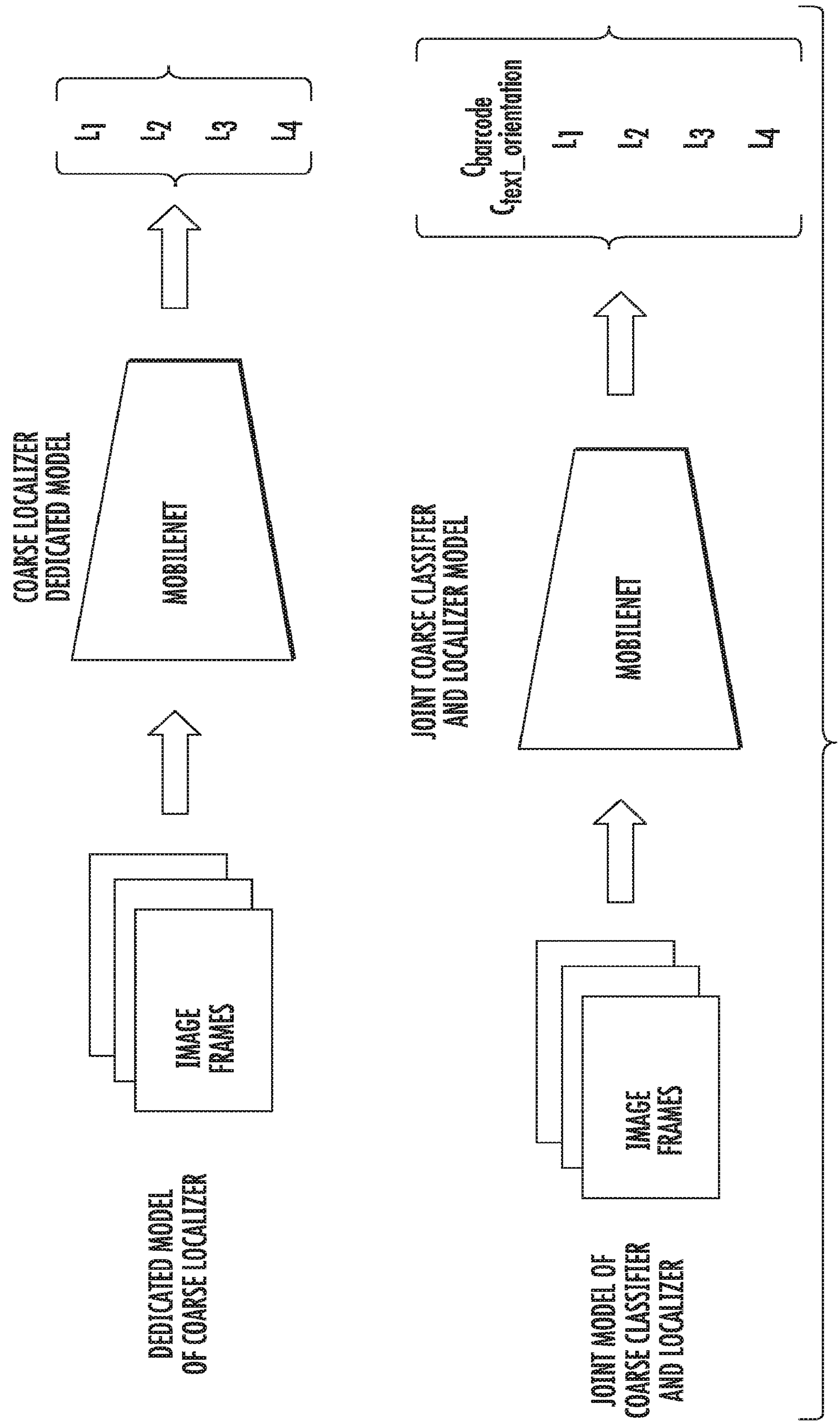
FIG. 4 illustrates example architectures for machine-learned models included as part of methods and systems for object detection and/or OCR in accordance with example implementations of the present disclosure.

FIG. 4 depicts several non-limiting examples of possible model architectures for machine-learned models according to the present disclosure. Example machine-learned models disclosed herein can be configured to classify image data using various architectures that can define multiple training heads and outputs. For example, a dedicated model can be trained using labeled images to identify whether text is present in an image, and in what areas of the image. Thus, the model can be configured to generate an output for each image frame comprising a vector of labels (e.g., L1, L2, L3, and L4). Each vector element associated with a region of the image and each label value indicating a True/False binary response. In another example, a joint model can be trained using labeled images (e.g., images including a bounding box identifying the object as well as an attribute of the object such as object orientation). In this case, the joint model can include similar outputs as the dedicated model; however, the additional training data can be used to extract additional information using an additional head or heads. For example, the model can be configured to not just determine in what regions of an image text is present, but also the orientation of text. Additionally, further objects may be included in the set of objects, such as barcodes, that can extend the output.

ADDITIONAL DISCLOSURE

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for improving object detection efficiency, the method comprising:

obtaining, by a computing system comprising one or more computing devices, an image;

processing, by the computing system, the image with a first machine-learned model to generate a prediction as to whether one or more of pre-defined regions of the image comprise a pre-defined region of the image in which at least one object included in a class of objects is present;

generating a dataset that represents the one or more of the pre-defined regions where the at least one object included in the class of objects is predicted to be present; and processing, by the computing system, the dataset that represents the one or more of the pre-defined regions where the at least one object included in the class of objects is predicted to be present, with a second machine-learned model to generate a label for the at least one object, wherein a number of the one or more of the pre-defined regions of the image represented in the dataset processed with the second machine-learned model to generate the label is less than a number of the pre-defined regions processed with the first machine-learned model to generate the dataset, and wherein processing a reduced number of regions with the second machine-learned model decreases the computational load of the computing system for performing object detection.

2. The computer-implemented method of claim 1, wherein the dataset is representative of only the one or more of the pre-defined regions of the image where the at least one object included in the class of objects is present, further comprising:

generating, by the computing system and based at least in part on an output of the first machine-learned model, the dataset representative of only the one or more of the pre-defined regions of the image where the at least one object included in the class of objects is present.

3. The computer-implemented method of claim 2, wherein the dataset comprises a masked version or a cropped version of the image.

4. The computer-implemented method of claim 1, wherein the label comprises a bounding box containing all of the pre-defined regions where the at least one object included in the class of objects is present.

5. The computer-implemented method of claim 1, wherein processing, by the computing system, the dataset that represents the one or more of the pre-defined regions in which the at least one object included in the class of objects is present comprises:

at least one of masking or cropping data in one or more other pre-defined regions in which the at least one object included in the class of objects is not present; and in response to the at least one of the masking or the cropping of the data in the one or more other pre-defined regions, processing, by the computing system, the dataset that represents the one or more of the pre-defined regions in which the at least one object included in the class of objects is present with the second machine-learned model that ignores the data in the one or more other pre-defined regions.

6. The computer-implemented method of claim 1, wherein the class of objects consists of one or more objects from a group: alphabetic characters, numbers, punctuation, words, machine-readable code, and faces.

7. The computer-implemented method of claim 1, further comprising:

partitioning, by the computing system, the image into the pre-defined regions to be processed by the first machine-learned model, wherein partitioning the image into the pre-defined regions that together encompass the whole of the image comprises:

applying at least one horizontal partition to divide the image into an upper region and a lower region; and applying at least one vertical partition to divide the image into a left region and a right region.

8. The computer-implemented method of claim 7, wherein the at least one horizontal partition and the at least one vertical partition are static.

9. The computer-implemented method of claim 7, wherein the at least one horizontal partition and the at least one vertical partition are adjustable.

10. The computer-implemented method of claim 7 wherein the at least one horizontal partition and the at least one vertical partition comprise a learned parameter, wherein the learned parameter is determined by a third machine-learned model configured to:

generate a heat map of objects included in at least one object for an example image; and partition in the image into one or more regions based on a constraint, wherein the constraint comprises: maximizing heat per box and minimizing the number of the one or more regions.

11. The computer-implemented method of claim 1, wherein the first machine-learned model is configured to generate an output used to generate the dataset that represents the one or more of the pre-defined regions of the image in which the at least one object included in the class of objects is present, and wherein the second machine-learned model is configured to generate a characteristic of the output.

12. The computer-implemented method of claim 11, wherein the characteristic comprises an orientation.

13. The computer-implemented method of claim 1, wherein the second machine-learned model is configured to perform optical character recognition (OCR), face detection, or facial recognition.

14. A computing system configured to perform object detection, the computing system comprising:

one or more processors;

one or more non-transitory computer-readable media that collectively store instructions that, when executed by the one or more processors cause the computing system to perform operations, the operations comprising:

obtaining an image depicting at least one object in a class of objects;

partitioning the image into regions that together encompass the whole of the image;

processing each of the regions with a first machine-learned model to generate a prediction as to whether one or more of the regions comprise a pre-defined region of the image in which one of the at least one object included in the class of objects is present;

generating a dataset that represents the one or more of the pre-defined regions where the at least one object included in the class of objects is predicted to be present; and processing the dataset that represents the one or more of the regions where the one of the at least one object included in the class of objects is predicted to be present, with a second machine-learned model to generate a label for the one of the at least one object, wherein a number of the one or more of the regions represented in the dataset processed with the second machine-learned model to generate the label is less than a number of the regions processed with the first machine-learned model to generate the dataset, and wherein processing a reduced number of regions with the second machine-learned model decreases the computational load of the computing system for performing object detection.

15. The computing system of claim 14, wherein the dataset is representative of only the one or more of the regions of the image where the one of the at least one object included in the class of objects is present, the operations further comprising:

generating, based at least in part on an output of the first machine-learned model, the dataset representative of only the one or more of the regions of the image where the one of the at least one object included in the class of objects is present.

16. The computing system of claim 14, wherein the one or more non-transitory computer-readable media are stored on a local device, and wherein the local device is a smartphone.

17. One or more tangible, non-transitory computer-readable media storing computer-readable instructions that when executed by one or more processors cause the one or more processors to perform operations, the operations comprising:

obtaining an image depicting at least one object in a class of objects;

partitioning the image into regions that together encompass the whole of the image;

processing each of the regions with a first machine-learned model to generate a prediction as to whether one or more of the regions comprise a pre-defined region of the image in which one of the at least one object included in the class of objects is present;

generating a dataset that represents the one or more of the pre-defined regions where the at least one object included in the class of objects is predicted to be present; and processing the dataset that represents the one or more of the regions where the one of the at least one object included in the class of objects is predicted to be present, with a second machine-learned model to generate a label for the one of the at least one object, wherein a number of the one or more of the regions represented in the dataset processed with the second machine-learned model to generate the label is less than a number of the regions processed with the first machine-learned model to generate the dataset, and wherein processing a reduced number of regions with the second machine-learned model decreases the computational load for performing object detection.

18. The computer-implemented method of claim 1, wherein the dataset is representative of only the one or more of the pre-defined regions of the image, further comprising:

generating, by the computing system and based at least in part on an output of the first machine-learned model, the dataset representative of only the one or more of the pre-defined regions of the image where the one of the at least one object included in the class of objects is present; and providing, to the second machine-learned model, the dataset representative of only the one or more of the pre-defined regions of the image where the one of the at least one object included in the class of objects is present.

19. The computer-implemented method of claim 1, further comprising:

classifying, by the computing system and with analysis via the first machine-learned model, the one or more of the pre-defined regions of the image based at least in part on whether the at least one object included in the class of objects is present in the one or more of the pre-defined regions of the image.

20. The computer-implemented method of claim 1, wherein the second machine-learned model is configured to determine training data comprising the label for the at least one object in the respective pre-defined region of the image in response to classifying, via the first machine-learned model, the one or more of the pre-defined regions.

* * * * *